GROOVED BULK SEMICONDUCTOR OSCILLATOR

Filed July 5, 1967

INVENTOR
GEORGE ALLAN SWARTZ
BY Edward J. Norton
ATTORNEY

United States Patent Office 3,453,560

Patented July 1, 1969

3,453,560

GROOVED BULK SEMICONDUCTOR OSCILLATOR

George Allan Swartz, Princeton, N.J., assignor to Radio Corporation of America, a corporation of Delaware Filed July 5, 1967, Ser. No. 651,293
Int. Cl. H03b *5/12, 11/10, 19/14*
U.S. Cl. 331—107 7 Claims

ABSTRACT OF THE DISCLOSURE

There is disclosed a bulk semiconductor oscillator having a groove of a specified depth and width on one of its surfaces. The groove is positioned transverse to the length of the bulk material. An electric field is applied across the sample of bulk semiconductor material in a manner to cause currents to flow transverse to and near the grooved surface. Instabilities are generated in the semiconductor material which cause a wave resonance at the groove. The resonance at the groove produces feedback which causes the material to oscillate coherently at a frequency determined by the width of the groove.

The invention herein described was made in the course of or under a contract or subcontract thereunder with the Department of the Air Force.

*Background of invention*

During the past few years there has been an effort to develop bulk solid state oscillators. The materials technology is concerned with the investigation of III–V and II–VI compounds, to obtain devices capable of high frequency operation. Certain of these materials such as n-type gallium arsenide (GaAs) exhibit high frequency oscillations when subjected to suitable electric fields. These devices have been referred to as "Gunn effect devices," L.S.A. devices, and so on. It has been stated in a recent article entitled, "Bulk Negative Resistance Semiconductor Devices," by John A. Copeland in the I.E.E.E. Spectrum, May 1967, on pages 71 to 77, that certain materials do not fulfill the criteria for such operation. In spite of this, the technology of some of these materials such as indium arsenide (InAs) and indium antimonide (InSb), is relatively advanced; as means of fabrication and purification for these materials are well known. Therefore, it would be economical and practical to devise high frequency oscillators utilizing; certain of these other materials.

Another important problem existing in the art is the necessity for coupling the power emitted by all such bulk semiconductor devices into a capable circuit structure to enable sufficient output operation. There is also a need to develop a device which is capable of high frequency operation while possessing the further advantage of having a tuning range over a band of frequencies.

It is therefore an object of the present invention to provide an improved bulk semiconductor oscillator.

Another object is to provide an improved bulk semiconductor oscillator which is easily coupled to an output circuit for efficient operation.

Still a further object is to provide an improved bulk semiconductor oscillator capable of being tuned over a relatively high frequency band.

These and other objects of the present invention are accomplished in one embodiment by employing a rectangular body of indium antimonide. At each end of the body there is coupled a suitable contact to enable accommodation of an electric field. At least one surface of the body has a groove of a specified width, which groove is positioned transverse to the length of the body. When an electric field is applied across the contacts, current streams are caused to flow in a direction transverse to and near the grooved surface. These current streams set up instabilities within the semiconductor body which resonate at a frequency determined by the width of the groove causing the device to emit coherent oscillations. The groove is dimensioned so that it can easily accommodate a strip line output circuit which efficiently couples out the energy of these oscillations. The device can be tuned over a fairly wide frequency range by subjecting it to a magnetic field which has a component longitudinal to the groove. The angle between the external magnetic field, and the current flow through the specimen, together with the dimensions of the groove determine the frequency of operation of this bulk oscillator.

For a clearer understanding of the invention reference is made to the following specification, together with the accompanying figures in which.

Figure 1:
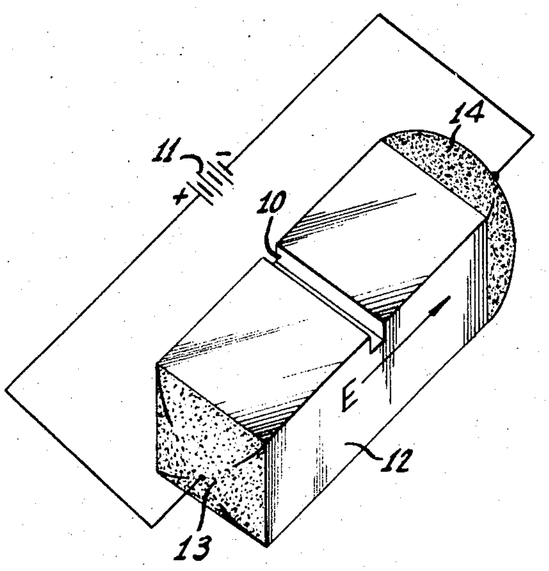
FIGURE 1 is a plan view of an oscillator according to this invention.

If reference is made to FIGURE 1 there is shown a rod 12 of p-type indium antimonide, for example. It has been found that the device to be described operates adequately with indium antimonide but other materials such as gallium phosphide, indium arsenide could be used as well. The rod 12 is rectangular in cross section and has a typical size of approximately .5 millimeter in length, .12 millimeter in width and .15 millimeter in height. The rod 12 is suitably doped so that it contains an excess of holes and hence is referred to, in solid-state semiconductor technology, as p-type indium antimonide. At one end of the rod 12, there is shown an injecting contact 14 which is fabricated from a gallium-indium-tellurium alloy. The contact 14 is deposited or alloyed on the rod or body 12 by a suitable process such as vapor deposition, an alloy technique or transport growth. Such techniques for forming contacts on semiconductor bodies are well known in the art and are not considered to be part of this invention. On the opposite end of the rod 12 is an ohmic contact 13. The contact 13 is non-injecting and hence the term ohmic is employed. On the top surface of the rod 12 there is shown a groove 10. The groove 10 has a rectangular cross-section and is aligned, as shown in the figure, transverse to the length of the rod 12. An electric field supplied by battery 11 is applied between the two contacts 13 and 14 tending to forward bias the injecting contact 14. The action of the biasing battery 11 produces an electric field across the specimen in a direction as shown by the arrow labelled E on FIGURE 1, and also creates electron and hole current streams through the semiconductor body 12 in a direction transverse to and near the grooved surface of the rod 12. The closeness of the streams to the groove 10 is of course a function of the depth of the groove 10. The flow of electron streams causes instabilities to be set up in the semiconductor body 12, and the groove 10 serves as a resonant structure for these instabilities. The wavelength of a space-charge wave, which is one supported by an injected electron stream, is about twice the groove width at the frequencies of the device's operation. As the electron streams travel past each wall of the groove 10, a portion of the wave is reflected and a wave resonance in the semiconductor body is established. These reflections cause feedback and hence an instability at a frequency which is determined primarily by the width of the groove 10. For given values of electron density, hole density and electric field, the resonance is forced to occur at only one frequency, and the emission from the bulk material is coherent because the wavelength is fixed by the groove width.

If one considers the theory of two-stream interactions, the groove 10 serves to generate a resonance in the charge carrier streams consisting of holes and electrons. The electron stream flows near the grooved surface of the semiconductor body 12 through a hole plasma. The device supports space charge waves, which are potentially unstable if proper feedback is supplied by the groove's dimensions. When the electron stream travels past each wall of the groove 10, the phase velocity of a wave carried by the stream changes and a portion of the wave is reflected. This reflected wave's power is partially transformed into a free-space wave and partially into a slow moving wave, which slow moving wave travels in the opposite direction to that of the electron stream at about the hole stream's velocity. As the slow moving wave now travels back past the groove 10, another reflection occurs, this wave then starts traveling in the same direction as the electron stream and can couple to it at a particular frequency and compatible phase velocity. The coupling causes a wave growth which is reflected again. The reflections create oscillations depending on the width of the groove which determines the time or frequency of these reflections and hence the operating frequency of the bulk oscillator.

The electric field supplied by battery 11 also serves to cause a breakdown underneath the groove 10 and the field lines underneath the groove are compressed, because of the narrow width of the semiconductor material underneath the groove 10, into a thin stream of charge carriers. The compressed lines initiate breakdown underneath the groove creating holes and electrons which result in multiple streams of holes and electrons and hence provide for multiple stream instability. It is important to note that if the groove 10 was not located on the surface of the semiconductor bar material 12, the device would not exhibit coherent oscillations and would at best generate a wide spectrum of microwave noise. Furthermore, the power obtainable from the grooved device depicted in FIGURE 1, is far greater than the power that the device would produce if one caused it to oscillate in this noisy mode and then by using a selective narrow band filter filtered out a desired harmonic from the noise spectrum.

Figure 2:
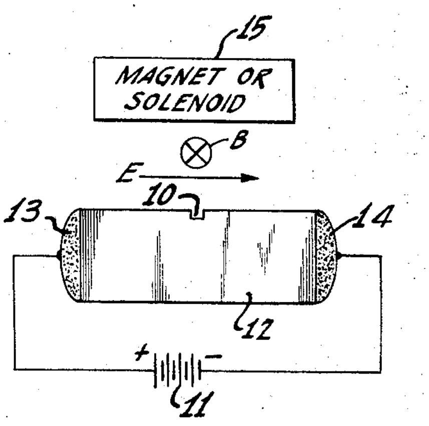
FIGURE 2 is a side view of an oscillator according to this invention.

If reference is now made to FIGURE 2 there is shown a side view of the device of FIGURE 1. Similar numerals have been retained to represent the various elements shown in FIGURE 1 for the sake of clarity. In FIGURE 2 there is shown a magnet or a solenoid 15 which produces a magnetic field designated by B and of a direction into the paper. The orientation of the magnetic field B is perpendicular to that of the electric field E produced across the semiconductor specimen or rod 12 by the battery 11. In light of the theory of two stream interaction the flow of an injected electron stream through a hole plasma in the presence of a transverse magnetic field (transverse to the electric field) as shown, will also generate instabilities. These instabilities will cause radiation of microwave noise if the lateral surface of the semiconductor rod 12 is perfectly flat. Placement in the surface of a groove 10, with a rectangular cross section, transverse to the electric field or current flow results in monochromatic microwave emission. For a given value of electron hole density, magnetic and electric fields the resonance again occurs at a frequency determined by the width of the groove. The groove being of a smooth rectangular cross section can support a range of frequencies, the range of frequencies that can be supported is determined by the instabilities present in the semiconductor body which can excite waves that have a compatible wavelength with that of the groove's width. Changes in the magnetic field can alter the phase velocity of the wave through the semiconductor rod 12. The waves supported by these carrier streams can be multiple waves. That is, the holes present can support one surface wave while the electrons present will support a second surface wave. As the phase velocity of these two waves are made to match, there will be a coupling of energy from one wave to another. If the groove is dimensioned to accommodate the frequency and the phase velocity of these coupled waves the device will oscillate coherently at the frequency of coupling due to the feedback introduced by the groove's dimensions specifically the width or distance between the walls of the groove. In this manner, changes in the intensity or angle of the magnetic field with respect to current flow or electric field will result in a change of the frequency of operation of the device within the frequency bands that the width of the groove can accommodate.

Figure 3:
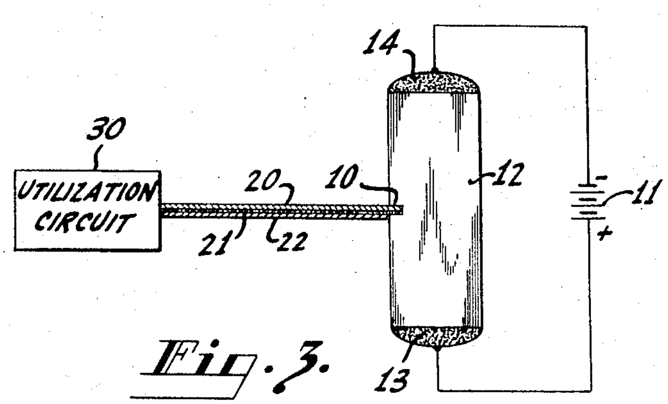
FIGURE 3 is a side view of an oscillator coupled at the groove to a strip-line output circuit.

If reference is made to FIGURE 3 there is shown a semiconductor oscillator, as described above, also having a groove 10. Again in FIGURE 3 similar numerals are used to represent parts of the device previously described. Shown coupled at the groove 10 is a thin layer of a conductive material 20. The layer 20 can be fabricated from copper, brass or some other suitable conducting material. The layer 20 is deposited on a layer of insulating material 21 which is dimensioned to fill the groove 10. The layer of insulating material 21 can be fabricated from alumina, rutile or some other suitable high dielectric constant material. The layer 21 serves as a support member for the top layer of conducting material 20. Underneath the layer of insulating material 21 there is deposited another layer of conducting material 22 which serves as a ground plane and hence may be grounded to a corresponding terminal of battery 11, which terminal represents the point of reference potential. The structure shown comprising layers 20, 21 and 22 is a strip line configuration.

The frequency present and reflected back and forth across the groove 10 is then coupled to the strip line, which in turn effiicently couples the energy to an output utilization circuit 30. In this manner the high frequency oscillations can be used without excessive loss due to radiation.

The device depicted above has exhibited coherent emission at frequencies from 18 to 30 gigahertz (gHz.) with a sample of indium antimonide of .5 millimeter in length, .18 millimeter in width and .14 millimeter in height. The sample had a groove which was 13 microns wide and 9 microns deep. The sample was subjected to an electric field of approximately 150 volts per centimeter. A magnetic field of 500 to 1100 gauss produced the above described frequency shift. Over this frequency range there was an injected current which ranged from .018 to .035 amp and the ambient hole density of the specimen was approximately $3\times10^{14}/\text{cm.}^3$. The angle between the electric field and magnetic field was varied from 35 to over 90 degrees and the device still emitted coherent radiation. It was found that an increase of the depth of the groove decreased the requirements on the intensity of the magnetic field needed for tuning the oscillator. To eliminate collision losses and adverse thermal effects the device was operated at an ambient temperature of less than 140° K.

What is claimed is:

1. A microwave oscillator for generating monochromatic microwave emission at a specified frequency comprising:
   (a) a rod fabricated from p-type bulk semiconductor material, having a groove of a specified width on one surface thereof,
   (b) means coupled to one end of said rod to form an injecting contact,
   (c) means coupled to the other end of said rod to form an ohmic contact, and
   (d) means coupled between said injecting and ohmic contacts to cause a current to flow through said bulk semiconductor rod in a direction transverse to said groove, said current causing said rod to coherently oscillate at a frequency determined by the width of said groove.

2. A microwave oscillator comprising:
(a) a body of p-type bulk semiconductor material having at least one groove on one surface thereof, said groove positioned transverse to the length of said body, and
(b) means coupled at each end of said body to cause a current to flow therethrough, said current flowing transverse to said groove, said current causing said body to emit coherent oscillations at a frequency determined primarily by said groove,
(c) means coupled to said bulk semiconductor body at said groove to respond to said oscillations.

3. The microwave oscillator as described in claim 2 wherein:
said body of semiconductor is p-type indium antimonide.

4. A microwave oscillator comprising:
(a) a body of bulk p-type semiconductor material having at least one groove of a specified width on one surface thereof, said groove positioned substantially transverse to the length of said body,
(b) means coupled between each end of said body to cause current to flow through said body in a direction transverse to said groove, said currents causing said body to oscillate at a first frequency substantially determined by said groove's width, and
(c) means to apply a magnetic field to said body in a direction longitudinal to and in proximity of said groove to change the frequency of oscillation of said body by causing at least one of said currents flowing through said body to change its phase velocity.

5. A microwave oscillator, comprising:
(a) a body of p-type semiconductor material, having a groove of a specified width on one surface thereof, said grooves positioned transverse to said body's length,
(b) biasing means coupled between both ends of said body to cause current streams to flow through said body in a direction transverse to said groove, said current streams causing said body to oscillate at a first frequency determined by the width of said groove, and
(c) means, including a magnetic field coupled to said body to cause one of said current streams to flow closer to said grooved surface to change said first frequency to a second frequency in accordance with the magnitude of said magnetic field.

6. The device as claimed in claim 5 wherein:
said magnetic field is longitudinal to and in close proximity to said surface of said body containing said groove.

7. An oscillator for generating coherent frequency oscillations comprising:
(a) a body of p-type indium antimonide having a length at least two times greater than its width and height and having at least one groove of a specified dimensional cross section on a surface thereof, said groove positioned transverse to said body's length,
(b) an injecting contact fabricated from a gallium-indium-tellurium alloy coupled to one end of said body,
(c) an ohmic contact coupled to the opposite end of said body,
(d) means for applying an electric field between said injecting and ohmic contacts in a direction to forward bias said injecting contacting to cause carrier-current streams to flow near said grooved surface through said body in a direction substantially transverse to said groove, said carrier streams causing said body to oscillate at a first frequency primarily determined by the dimensions of said groove, and
(e) means to apply a magnetic field longitudinal to said groove to cause at least one of said carrier streams to flow nearer said grooved surface to cause said body to oscillate at a second frequency also determined by the dimensions of said groove and said current flow near said groove.

References Cited

UNITED STATES PATENTS 3,293,567 12/1966 Komatsubara et al. ---- 331—107
3,365,583 1/1968 Gunn ----------- 331—107 X

OTHER REFERENCES

Kikuchi et al.: "The Sogicon—A New Type of Semiconductor Oscillator," Journal of Physical Society of Japan, vol. 17, 1962, pp. 881–882.

ROY LAKE, *Primary Examiner.*

S. H. GRIMM, *Assistant Examiner.*

U.S. Cl. X.R.

307—309; 317—234